Nov. 22, 1927.
C. BELTRAMI
1,649,800
VEHICLE ELASTIC SUSPENSION
Filed Jan. 15, 1924
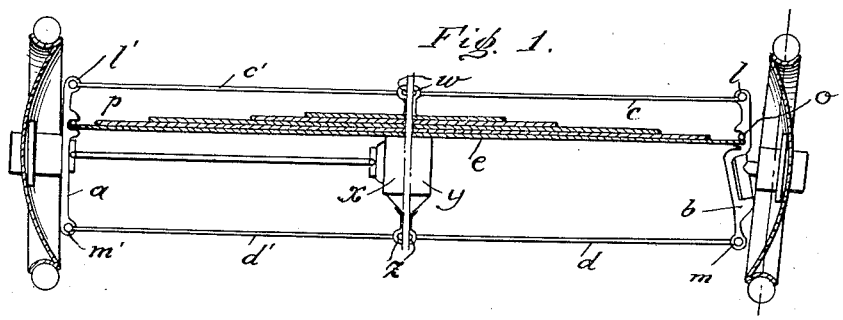
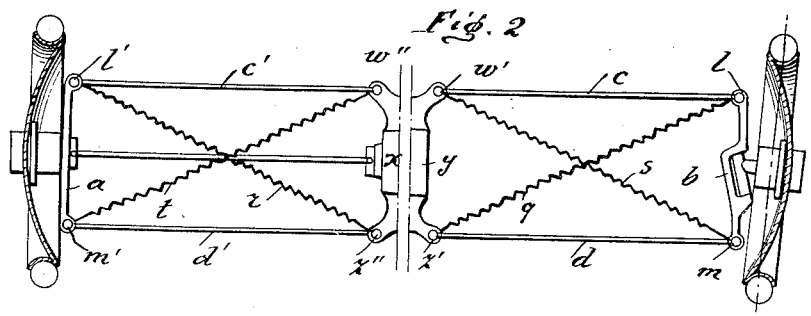
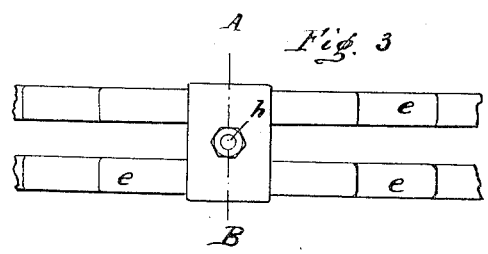
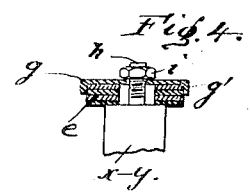
Inventor
C. Beltrami
By Marks & Clerk
Attys.

Patented Nov. 22, 1927.

1,649,800

UNITED STATES PATENT OFFICE.

CESARE BELTRAMI, OF MILAN, ITALY.

VEHICLE ELASTIC SUSPENSION.

Application filed January 15, 1924, Serial No. 686,427, and in Italy January 26, 1923.

The present invention relates to a vehicle elastic suspension arrangement essentially made up of hinged parallograms and springs.

The novel arrangement is diagrammatically illustrated in the annexed drawing, in which:

Figs. 1 and 1ª show one form of the invention, Fig. 1 representing the rear suspension and Fig. 1ª the front suspension.

Figs. 2 and 2ª are views similar to Figs. 1 and 1ª and show a modified form.

Fig. 3 is a top plan view of a modified form of the yielding arrangement according to Figs. 1 and 1ª, on a larger scale.

Fig. 4 is a section through 4—4 in Fig. 3.

To the rear casing —x— of the differential gear and to the front casing —y— of the steering gear are pivotally attached at —w—, by one of their ends, the two rods —c— and —c'—, and at —z—, the two rods —d— and —d'—. The opposite ends of the rods —c— and —c'— are pivotally attached at —l—, —l'— to the upper end of substantially vertical arms —b—, —a— which constitute the supporting uprights for the wheels. To the lower ends of —b— and —a— are pivotally attached at —m—, —m'—, the other ends of the rods —d—, —d'—. In this manner for each pair of wheels, two hinged parallelograms are formed having a vertical side —w—, —z— in common and two other rigid vertical sides —l—, —m— and —l'—, —m'—.

The rod sets —c—c'— and —d—d' may have their inner ends hinged, not to the center pivots —w— and —z—, but, as shown in Fig. 2, to different points, for instance, —w''—z''— of the differential casing —x— and —w'—z'— of the steering gear casing —y—.

The springing of the parallelograms may be obtained by means of a single laminated spring —e— (Fig. 1), the ends of which are pivotally attached to the vertical arms —b— at —o— to the vertical arms —a— at —p—, the center of the spring being secured to the center line of the differential casing —x— and steering gear casing —y—.

The spring —e— may be replaced, as shown in Figs. 3 and 4, by two parallel laminated springs —e'—. The ends of these springs are pivotally connected to the vertical arms —b— and —a— of the parallelograms in the same manner as shown in Fig. 1. In the center, the springs are spaced apart by a bolt —h— projecting from either casings —x— and —y— and lying between the two springs.

The springs —e'— are held in place by a plate —g—, whose turned over edges —g— g'— grip the outside edges of one or more of the spring laminations. The plate —g— in its turn is secured in place by tightly screwing the nut —i— on the screw-threaded end of bolt —h—.

The laminated spring may be replaced by other types of springs adapted to maintain the parallelograms in the positions shown in the drawing. For instance, between the points —l—z'—, —l'—z''—, (Fig. 2) spiral tension springs —q— and —r— may be provided, or between the points —m—w— and —m'—w— (Fig. 1), resp. —m—w'— and —m'—w''— spiral compression springs —s— and —t— may be provided. Eventually both compression and tension springs may be provided.

Having now particularly described my said invention, I declare that what I claim is:

In a motor vehicle, a casing arranged at the center of the vehicle, road wheels arranged at the side of the vehicle, vertical arms carrying axles on which the road wheels are mounted, parallel rods pivotally connecting the arms to the casing, said casing, arms and links forming a pair of parallelograms arranged side by side, and spring means having its central portion connected to the upper portion of the casing and its outer ends pivotally connected to said arms, said spring means consisting of a laminated spring having its central portion resting on the casing and its ends secured to the arms intermediate the ends of said arms.

Signed at Milan, Italy, this 29th day of December, 1923.

CESARE BELTRAMI.